United States Patent [19]
Taurat et al.

[11] Patent Number: 5,336,376
[45] Date of Patent: Aug. 9, 1994

[54] DISTILLATION COLUMN WITH VAPOROUS SIDESTREAM REMOVAL

[75] Inventors: Siegfried Taurat; Heinrich Steude, both of Leverkusen; Ludwig Deibele, Köln; Heinz-Jürgen Alpers, Krefeld, all of Fed. Rep. of Germany

[73] Assignee: Bayer Aktiengesellschaft, Leverkusen, Fed. Rep. of Germany

[21] Appl. No.: 54,116

[22] Filed: Apr. 27, 1993

[30] Foreign Application Priority Data

May 4, 1992 [DE] Fed. Rep. of Germany ....... 4214738

[51] Int. Cl.$^5$ .............................................. B01D 3/42
[52] U.S. Cl. ................... 202/182; 202/185.1; 202/198; 202/201; 202/202; 203/1; 203/49; 203/98; 203/99; 203/DIG. 19; 203/DIG. 25
[58] Field of Search ............... 203/98, 1, 99, DIG. 19, 203/49, DIG. 25; 202/185.1, 182, 198, 202, 201, 196, 193

[56] References Cited

U.S. PATENT DOCUMENTS

| | | | |
|---|---|---|---|
| 3,547,783 | 12/1970 | Yamaguchi et al. | 203/DIG. 19 |
| 3,567,628 | 3/1971 | Van Pool | 203/DIG. 19 |
| 3,725,211 | 4/1973 | Gehrken et al. | 203/DIG. 19 |
| 4,166,774 | 9/1979 | Wagner | 203/DIG. 19 |
| 4,276,125 | 6/1981 | Issei | 203/98 |
| 4,333,801 | 6/1982 | Pujado | 203/98 |
| 4,348,540 | 9/1982 | Ferris et al. | 203/98 |
| 4,623,432 | 11/1986 | Ali | 203/DIG. 19 |
| 4,662,995 | 5/1987 | Lipkin et al. | 203/DIG. 19 |
| 4,702,819 | 10/1987 | Sharma et al. | 203/DIG. 19 |

FOREIGN PATENT DOCUMENTS

| | | |
|---|---|---|
| 125821 | 5/1977 | Fed. Rep. of Germany . |
| 3102780 | 12/1981 | Fed. Rep. of Germany . |
| 3422575 | 12/1985 | Fed. Rep. of Germany . |
| 0197709 | 9/1977 | U.S.S.R. ............... 203/98 |
| 2068390 | 8/1981 | United Kingdom ....... 203/DIG. 19 |

Primary Examiner—Virginia Manoharan
Attorney, Agent, or Firm—Sprung Horn Kramer & Woods

[57] ABSTRACT

In a distillation column with vaporous sidestream removal, the vaporous product removed is condensed in a condenser. The vapor pipe provided for the removal of product opens into a dip tank of which the upper end is connected to the condenser while its lower end is connected to a discharge pump. Inert gas present in the condensate is returned to the column above the sidestream removal through an inert gas pipe arranged at the upper end of the condenser.

3 Claims, 2 Drawing Sheets

DISTILLATION COLUMN WITH VAPOROUS SIDESTREAM REMOVAL

BACKGROUND OF THE INVENTION

This invention relates to a distillation column with vaporous sidestream removal and a condenser for condensing the vaporous product removed.

The bottom product removed in liquid form from the bottom of distillation columns often contains high-boiling organic residues or salts. To remove these unwanted secondary products, the main product is removed in vaporous form in a sidestream. Where a large separation factor is present between both, a sidestream removal which consists solely of a sidestream condenser and which represents a distillation stage is sufficient for this purpose. If this separation is inadequate, a sidestream column has to be arranged between the main distillation column and the side-stream condenser.

It is now standard practice to connect a descending sidestream condenser to the vapor pipe for the vaporous sidestream removal. The condensate is removed by a pump of which the output is either constant or is regulated via a cascade by the temperature, the inflow volume or the bottom level of the column. The pump is operated in such a way that the lower part of the cooling surface of the sidestream condenser is covered with condensate. If less liquid condenses than is removed by the pump, the filling level in the sidestream condenser falls so that more cooling surface is uncovered and the accumulation of condensate increases again. By contrast, if more liquid condenses than is removed by the pump, the liquid level in the condenser increases, the cooling surface becomes covered and the accumulation of condensate falls. Automatic regulation is thus established.

This method of sidestream removal presents problems when the sidestream condenser is filled with air when the installation is started up or when, during distillation, the vapors contain non-condensable gases. These "inerts" (air or non-condensable components) can only be removed to a limited extent by the discharge pump. The path through the sidestream pipe (vapor pipe) back to the column against the flow of vapor is also blocked. The inerts thus cover the cooling surfaces of the sidestream condenser, impair heat transfer and gradually lead to its failure. The situation can only be remedied by temporarily filling the condenser with air, the condenser then having to be separated from the column to avoid product losses. The operating times of the installation are thus shortened.

SUMMARY OF THE INVENTION

The problem addressed by the present invention was to avoid the difficulties caused by the inerts by simple apparatus-related measures.

According to the invention, the solution to this problem in a distillation column with a sidestream condenser is characterized in that the sidestream pipe opens into a dip tank of which the upper end is connected to the condenser while its lower end is connected to a discharge pump and in that an inert gas pipe arranged at the upper end of the condenser is returned to the column above the sidestream removal.

If the sidestream has to be additionally purified by distillation, a sidestream column may be built into the sidestream pipe, being equipped with a return pipe which branches off behind the discharge pump in the direction of flow.

If too few inerts flow through the inert gas pipe back into the column, so that vapors from the column follow this path to the condenser, nitrogen may be additionally introduced into the inert gas pipe.

By means of the apparatus according to the invention, the inerts may readily be returned to the column. The additional outlay on equipment is minimal. More particularly, the apparatus according to the invention may readily be fitted to existing installations. The invention also simplifies and improves the regulation of vapor volume in the sidestream pipe.

Examples of embodiment of the invention are described in detail in the following with reference to the accompanying drawings, wherein:

DETAILED DESCRIPTION OF THE INVENTION

Figure 1:
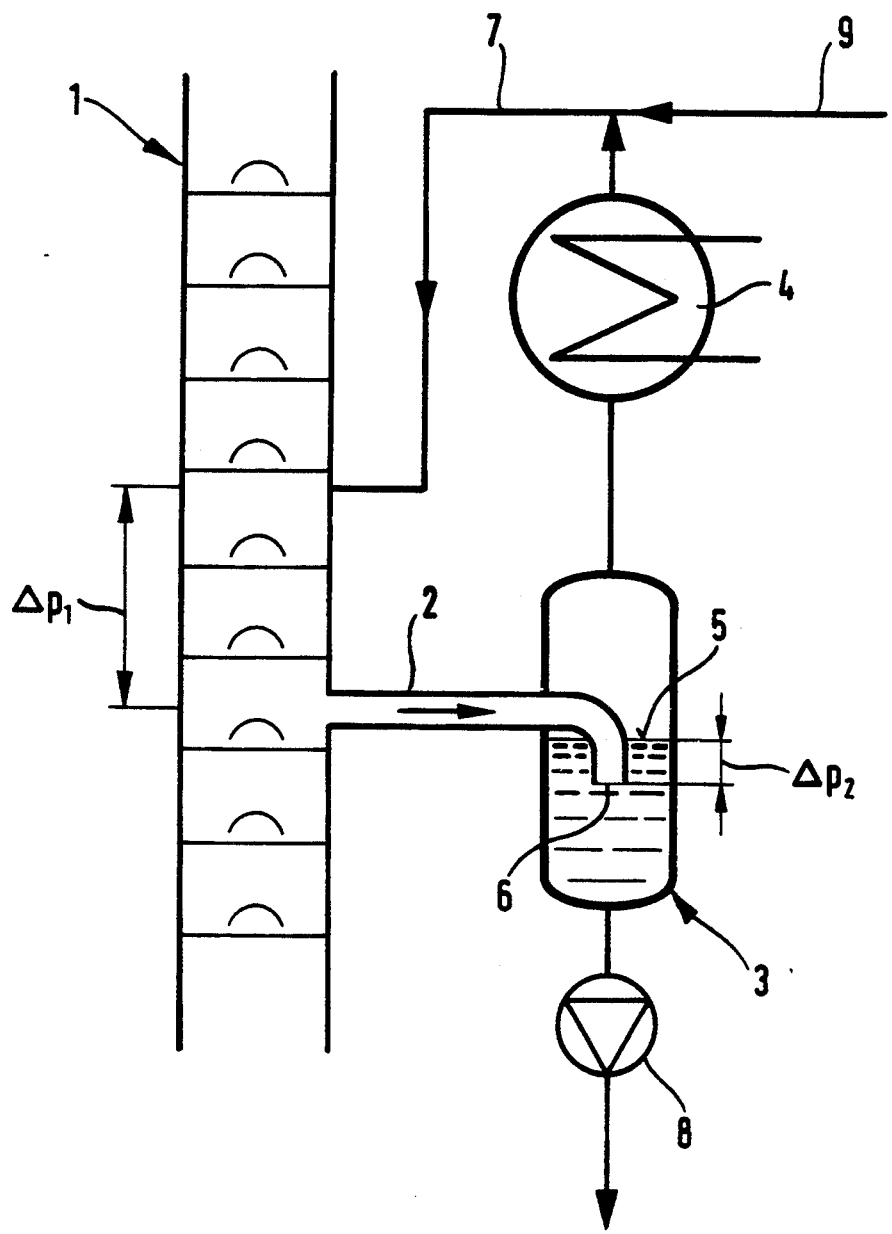
FIG. 1 is a flow chart of a distillation column with a dip tank and a condenser.

As shown in FIG. 1, the vapors removed from the column 1 flow through the sidestream pipe 2 (vapor pipe) into the dip tank 3 and from there into the condensers 4 arranged above. The liquid flowing back from the condenser 4 collects in the dip tank 3 to the height of the liquid level 5 which is situated above the opening 6 of the vapor pipe 2. A dip closure is thus developed in the tank 3, enabling the volume of condensate to be automatically regulated. At its upper end, the condenser 4 is connected to an inert gas pipe 7 which leads back to the column 1 and which opens into the column above the vapor pipe 2. The inerts (air and other non-condensable gaseous components) are returned to the column 1 through the pipe 7.

The pressure difference $\Delta p_2$ corresponding to the depth to which the vapor pipe 2 dips into the tank 3 is determined by the pressure loss $\Delta p_1$ of the column section between the inert gas pipe 7 and the vapor pipe 2 and normally amounts to approx. 10 mm. A predetermined quantity of liquid (condensate) is removed from the dip tank 3 by the discharge pump 8. If less liquid condenses than can be removed by the pump 8, the liquid level in the dip tank 3 falls, so that a larger quantity of vapor flows to the condenser 4 and the accumulation of condensate also increases. If, by contrast, a larger quantity of liquid is condensed than can be removed by the pump 8, the liquid level in the dip tank 3 rises. As a result, there is a reduction in the amount of vapor flowing into the condenser 4 and hence in the accumulation of condensate. An operationally safe and reliable automatic control of the volume of condensate is thus achieved with these simple apparatus-related measures.

If too few inerts flow through the inert gas pipe 7 and vapors from the column 1 are in danger of entering the condenser 4 through the inert gas pipe 7, nitrogen is admitted to the inert gas pipe 7 through the pipe 9.

Figure 2:
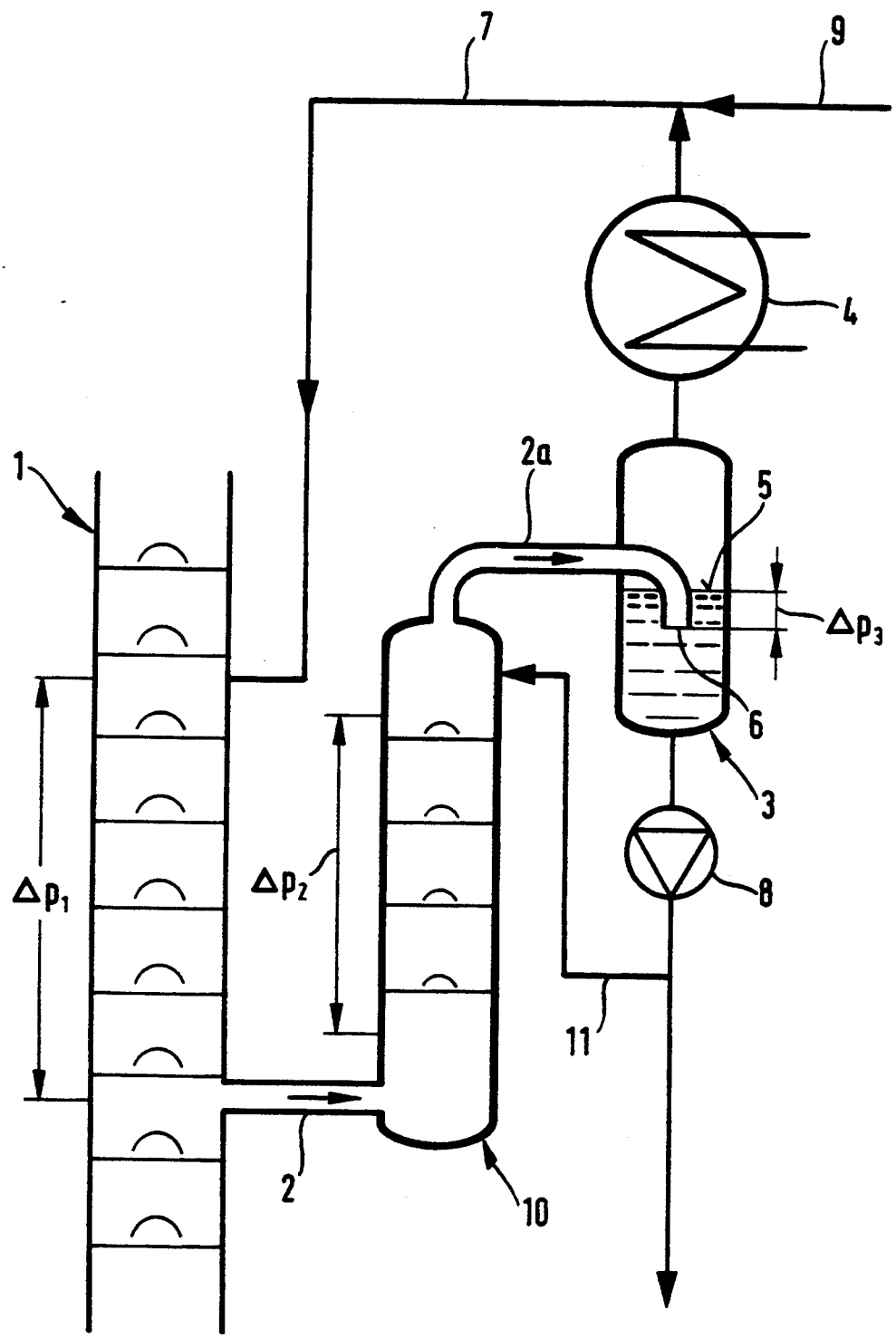
FIG. 2 shows a distillation column with the same attachments as in FIG. 1 and, in addition, a sidestream column.

In some cases, the vaporous product removed in the sidestream has to be additionally purified by further distillation-based separation. To this end, the apparatus shown in FIG. 1 is modified (see FIG. 2) to the extent that a sidestream column 10 is built into the vapor pipe 2. The necessary return pipe 11 for the sidestream column 10 branches off behind the discharge pump 8 (in the direction of flow). Under steady-state operating conditions, the pressure difference $\Delta p_1$ in the column section between the inert gas pipe 7 and the sidestream or vapor pipe 2 is equal in this case to the pressure drop $\Delta p_2$ in the sidestream column 10 plus the pressure difference $\Delta p_3$ corresponding to the depth of penetration of the vapor pipe in the dip tank 3. The apparatus shown in FIGS. 1 and 2 are otherwise the same.

EXAMPLE

A distillation column (450 mm in diameter filled to a height of 4 m) for working up dimethyl carbonate was operated at a head pressure of 1 mbar and a bottom pressure of 5 mbar. The vaporous sidestream removal was situated directly above the bottom of the column. Its vapor pipe had a diameter of 225 mm. The quantity removed amounted to 24 kg/h. Continuous operation was only possible through the proposed positioning of the vaporous sidestream removal. A complicating factor was that the bottom product eliminates carbon dioxide.

We claim:

1. A distillation column comprising: a column wall; a dip tank having an upper end and a lower end; means extending from the column wall at a first vertical level and in communication with the column for removing a sidestream and comprising a vapor pipe extending into the dip tank between the upper and lower ends and having a discharge outlet in the dip tank; and means for maintaining a liquid level in the dip tank above the discharge outlet of the vapor pipe comprising a condenser connected to the upper end of the dip tank, a discharge pump connected to the lower end of the dip tank and an inert gas pipe disposed at an upper end of the condenser and connected to the column wall for communication with the column at a second vertical level which is above the first vertical level.

2. The distillation column according to claim 1, wherein the means for removing the sidestream further comprises a sidestream column in the vapor pipe and a return pipe branching off from downstream of the discharge pump and connected to the sidestream column.

3. The distillation column as recited in claim 1, wherein the inert gas pipe has an inlet for nitrogen.

* * * * *